United States Patent [19]

Narita

[11] Patent Number: 4,466,661
[45] Date of Patent: Aug. 21, 1984

[54] AUTOMOTIVE SEAT

[75] Inventor: Masanori Narita, Yamato, Japan

[73] Assignee: Nissan Motor Co., Ltd., Yokohama, Japan

[21] Appl. No.: 445,763

[22] Filed: Nov. 30, 1982

[30] Foreign Application Priority Data

Dec. 19, 1981 [JP] Japan ................................ 56-204535

[51] Int. Cl.³ ............................................. B60N 1/04
[52] U.S. Cl. ................................... 297/367; 297/366; 297/379
[58] Field of Search ............... 297/366, 367, 368, 369, 297/379, 353, 354, 355, 356

[56] References Cited

U.S. PATENT DOCUMENTS

| 3,953,069 | 4/1976 | Tamura et al. | 297/379 |
| 3,957,312 | 5/1976 | Bonnaud | 297/366 |
| 3,958,828 | 5/1976 | Ishida et al. | 297/367 |
| 4,148,525 | 4/1979 | Yamanashi | 297/367 |

FOREIGN PATENT DOCUMENTS

| 6381473 | 6/1975 | Australia. | |
| 6529674 | 8/1975 | Australia. | |
| 53-23426 | 3/1978 | Japan | 297/367 |

Primary Examiner—William E. Lyddane
Assistant Examiner—Mark W. Binder
Attorney, Agent, or Firm—Schwartz, Jeffery, Schwaab, Mack, Blumenthal & Koch

[57] ABSTRACT

In an automotive seat assembly including an operating lever device operative to permit a seat back to be inclined forwardly or backwardly, the operating lever device is provided with means for preventing any part thereof from being projected out of the back or front face of the seat back when the latter is inclined forwardly or backwardly.

1 Claim, 9 Drawing Figures

AUTOMOTIVE SEAT

BACKGROUND OF THE INVENTION

1. Field of the Invention

This invention relates to an automotive seat assembly, and more particularly it pertains to an operating lever device for such a seat assembly.

2. Description of the Prior Art

Generally, in a conventional automotive seat assembly, each of the front seats thereof is provided with a so-called walk-in mechanism for permitting each front seat to be automatically advanced to its frontmost position for the purpose of facilitating a back-seat passenger's getting in and out of the automobile. Furthermore, the seat backs of the front seats are arranged to be forwardly inclined in interlocking relationship with the walk-in operation of the front seats. In this connection, the design is made such that the forward inclination of each seat back and the walk-in operation of each front seat can be effected simply by actuating a back release lever which constitutes an operating lever device provided on the side of each seat back.

As shown in FIG. 1 of the accompanying drawings, the aforementioned conventional operating lever device, or the back release lever 1 is rotatably mounted on a shaft 7 on which a reclining lever 4 and seat back arm are also mounted in co-axial relationship with each other. By turning the back release lever 1 clockwise as viewed in FIG. 1, a pin 2 provided on the back face of the back release lever 1 is pressed against the reclining lever 4 serving as an operating plate for the back release lever 1 is thereby turned, as a result of which a seat back B is forwardly inclined and at the same time, a lock plate (not shown) of the walk-in mechanism is turned. In this way, a seat cushion A is advanced as far as the frontmost position.

However, such a conventional back release lever 1 has the following drawbacks: Due to the fact that the back release lever 1 is normally biased by a spring 8 so as to assume the same angular position as the normal seating position of the seat back B, the back release lever 1 is prevented from being projected out of the front or back face of the seat back B, when the seat back B is set to assume the above-mentioned normal seating position so that the possibility is precluded that the passenger has his or her clothing caught at the back release lever 1 or stumbles thereagainst, whereas when the seat back B is forwardly inclined as shown in FIG. 3 or when the seat back B is backwardly inclined to assume its full reclining position as shown in FIG. 4, the back release lever 1 is projected out of the back or front face of the seat back B, so that the aforementioned possibility occurs when the passenger gets in or out of the automobile, and the back release lever 1 tends to be a hindrance to the passenger when the seat back B is set to assume the full reclining position.

SUMMARY OF THE INVENTION

Accordingly, it is an object of the present invention to provide an automotive seat assembly which is designed such that even when a seat back is forwardly or backwardly inclined, an operating lever device is prevented from projecting out of the back or front face of the seat back B, so that the possibility is eliminated that a passenger has his or her clothing caught on the operating lever or stumbles thereagainst when he or she gets in or out of the automobile, and yet the operating lever device constitutes no hindrance to the passenger when the seat back is set to assume the full reclining position.

Briefly, according to the present invention, there is provided an automotive seat assembly comprising a seat cushion, a seat back supported by the seat cushion, an operating lever device, a reclining mechanism adapted, upon actuation of the operating lever device, to permit the seat back to be forwardly or backwardly inclined, and a walk-in mechanism adapted, upon actuation of the operating lever device, to permit the seat cushion to be forwardly moved when the seat back is forwardly inclined, wherein the operating lever device is provided with means for preventing any part of the operating lever device from projecting out of the back or front face of the seat back when the seat back is inclined forwardly or backwardly.

Other objects, features and advantages of the present invention will become apparent from the ensuing description taken in conjunction with the accompanying drawings.

DESCRIPTION OF THE PREFERRED EMBODIMENTS

The present invention will now be described in detail with respect to embodiments thereof with reference to FIGS. 5 to 9.

Figure 1:
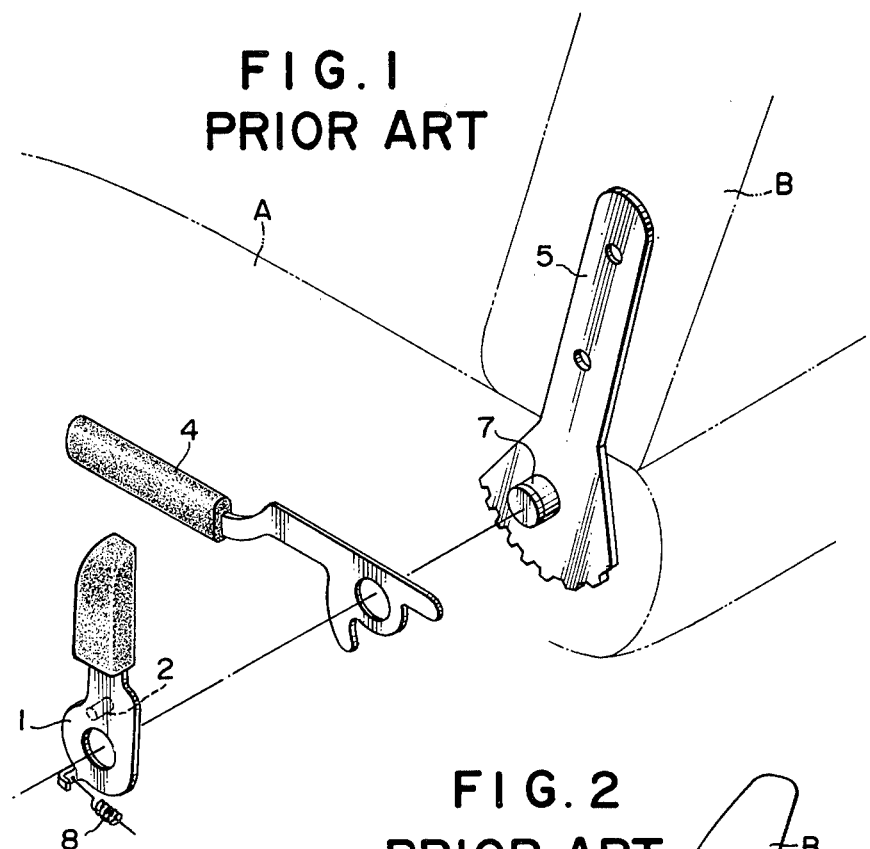
FIG. 1 is an exploded perspective view showing, in combination, a combination of a back release lever, which constitutes the conventional operating lever device, a reclining lever, and a seat back arm.
Figure 2:
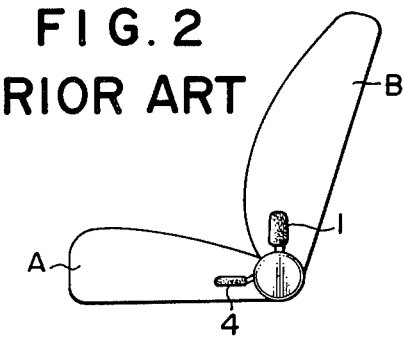
FIG. 2 is a schematic side view showing the positional relationship between the seat back of a seat provided with the conventional operating lever device, and a back release lever when the seat is at its normal seating position.
Figure 3:
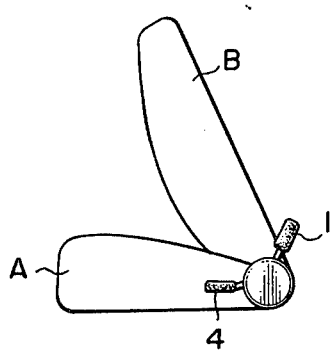
FIG. 3 is a schematic side view showing such a relationship when the seat undergoes walk-in operation.
Figure 4:
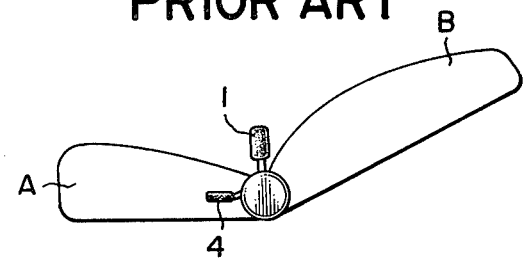
FIG. 4 is a schematic side view showing such a relationship when the seat is at its full reclining position.
Figure 5:
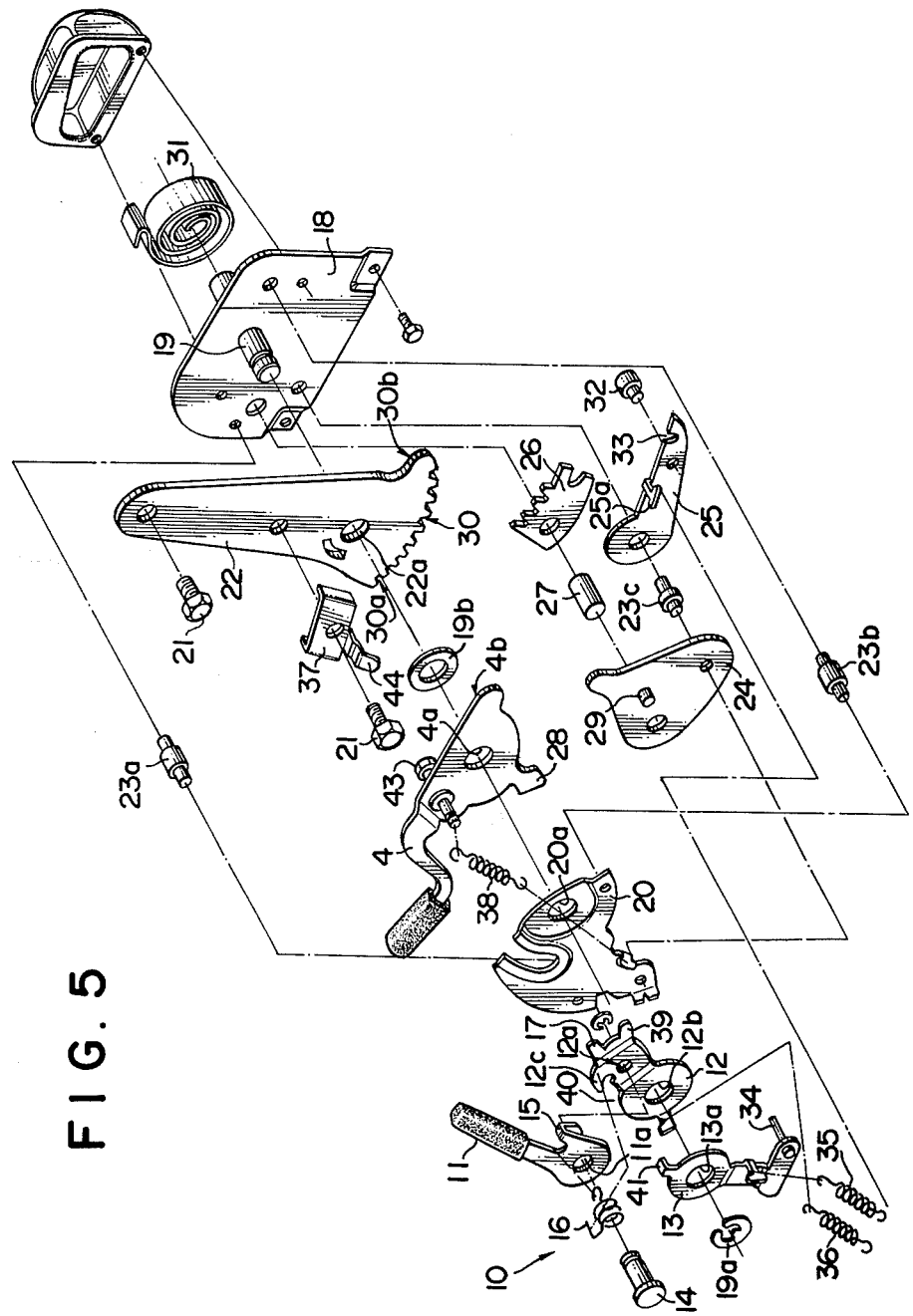
FIG. 5 is an exploded perspective view showing the construction of the operating lever device according to an embodiment of the present invention, and a reclining mechanism associated therewith.
Figure 6:
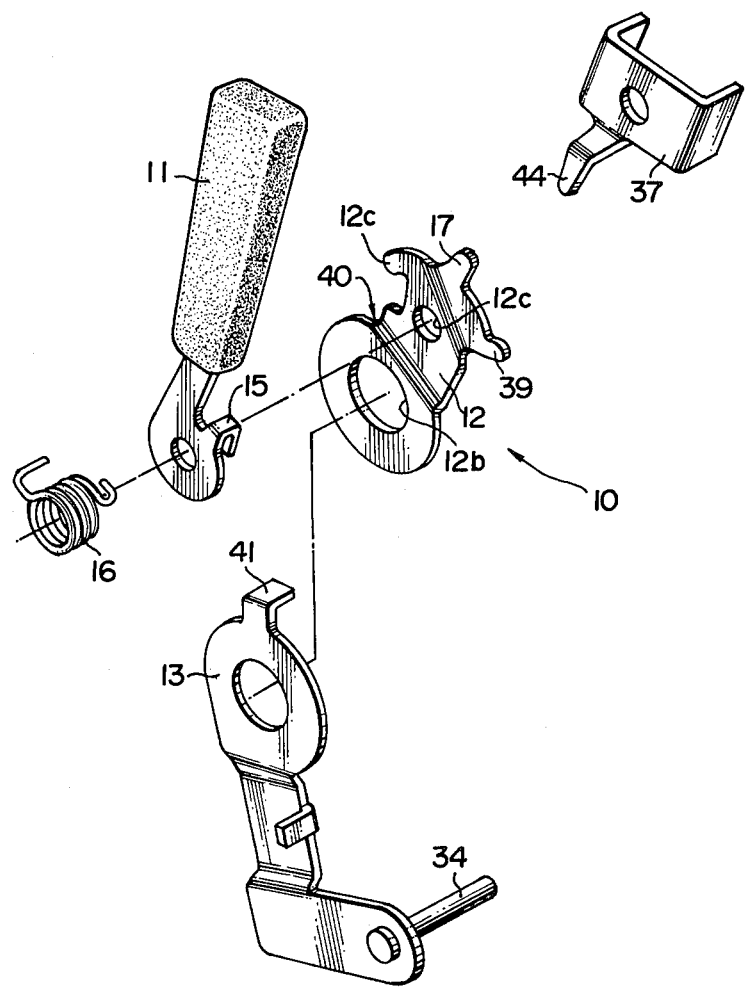
FIG. 6 is an enlarged, exploded perspective view showing the construction of the operating lever device shown in FIG. 5.

Referring to FIG. 5, there is shown an operating lever device 10, embodying the present invention, which comprises a back release lever 11, a transmit plate 12, and a walk-in lever 13. The back release lever 11 is formed with an opening 11a through which is inserted a back lever pin 14 which is also inserted through an opening 12a formed in the transmit plate 12. Further, the back release lever 11 is provided with an engagement projection 15 which is normally engaged with a projection 12c of the transmit plate 12 in such a manner as to be disposed in abutment with a projection 17 adapted to serve as a stopper for the transmit plate 12. The back release lever 11 is biased by a spring 16 which is loaded on the back release lever pin 14.

The transmit plate 12 and walk-in lever 13 are formed with apertures 12b and 13a, respectively, through which is inserted a shaft 19 attached to a base plate 18 so that the transmit plate 12 and walk-in lever 13 are coaxially supported on the shaft 19. The transmit plate 12 and walk-in lever 13 are retained in position by means of an E ring 19a. Furthermore, a holder plate 20, reclining lever 4 and seat back arm 22 are provided which are respectively formed with apertures 20a, 4a and 22a through which is also inserted the shaft 19 in such a manner that the elements 4, 20 and 22 are supported on the shaft 19 between the operating lever device 10 and the base plate 18. A bolt 21 is employed to securely attach the seat back arm 22 to a seat back B. A collar washer 19b is provided on the shaft 19 between the reclining lever 4 and the seat back arm 22.

Between the base plate 18 and the holder plate 20 attached thereto through shafts 23a and 23b are pivotally mounted a lower tooth support member 24 and stopper lever 25 by means of a shaft 23c. The lower tooth support member 24 and lower tooth 26 are rotatably mounted on a pin 27 which is attached to the base plate 18. As the reclining lever 4, which is adapted to serve as an operating plate for the reclining mechanism, is turned, a projection 28 provided thereon is pressed against a pin 29 provided on the lower tooth support member 24 so that the latter is thereby turned, as a result of which the lower tooth 26 is disposed out of engagement with an upper tooth 30 of the seat back arm 22.

When the lower tooth 26 is disposed out of engagement with the upper tooth 30 as mentioned above, the seat back arm 22 is turned, in such a direction that the seat back B is forwardly inclined, by means of a spring 31 loaded on the shaft 19 of the base plate 18. As a result, a pin 32 attached to the free end portion of the stopper lever 25 is pushed down by front portion 30a of the upper tooth 30 so that a walk-in lever pin 34 of the walk-in lever 13, which is retained in a recessed portion 33 of the stopper lever 25, is set at a free state. Subsequently, the walk-in lever pin 34 is elevated by rear portion 30b of the upper tooth 30, so that the walk-in lever 13 is turned anticlockwise as viewed in FIG. 5 against the biasing force of a spring 35 which is attached to the walk-in lever 13 and a lip 25a of the stopper lever 25. At the same time, the transmit plate 12 is pulled by a spring 36 which is attached to the transmit plate 12 and lip 25a of the stopper lever 25. A depressing plate 37 is secured to the seat back arm 22, and a spring 38 is provided between the reclining lever 4 and the holder plate 20 so that the reclining lever 4 is normally biased by the spring 38 in such a manner that it tends to be turned anticlockwise as viewed in FIG. 5.

Description will now be made of the operation of the aforementioned operating lever device 10.

Figure 7:
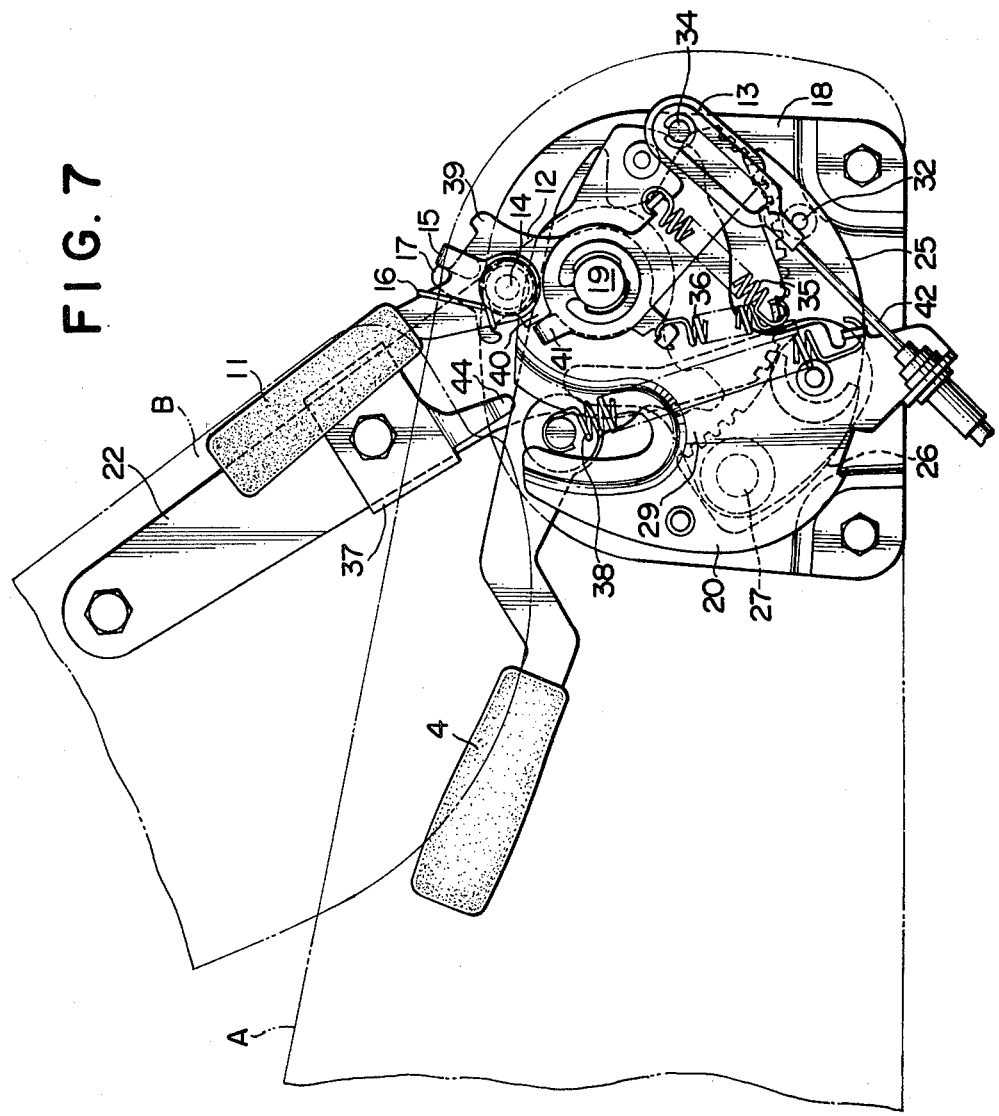
FIG. 7 is a side view illustrating the walk-in operation of the seat.

When the front seat is made to perform walk-in operation, the back release lever 11 is first turned about the back lever pin 14 against the biasing force of the spring 16, so that the engagement projection 15 is brought into abutment with the operating projection 39 of the transmit plate 12. As the back release lever 11 is further turned, the transmit plate 12 is pushed by the engagement projection 15 so as to be turned clockwise as viewed in FIG. 5, and the rear end portion 4b of the reclining lever 4 is pushed by the back lever pin 14 so as to be turned clockwise as viewed in FIG. 5. The pin 29 of the lower tooth support member 24 is pushed by the projection 28 of the reclining lever 4, so that the lower tooth 26 is disposed out of engagement with the upper tooth 30, thus resulting in the seat back arm 22 being turned to be forwardly inclined. At this time, the pin 32 of the stopper lever 25 is pushed down by the front portion 30a of the upper tooth 30 of the seat back arm 22, while the walk-in lever pin 34 is pushed up by the rear portion 30b of the upper tooth 30; thus, the walk-in mechanism (not shown) is unlocked by a wire 42 engaged with the walk-in lever pin 34, and the transmit plate 12 is pulled by the spring 36 so as to be turned clockwise as viewed in FIG. 5 until the stopper 40 thereof is disposed into abutment with the projection 41 of the walk-in lever 13. At this time, the back release lever 11, which has been stopped from the aforementioned turning movement and returned to its original position by the spring 16, is moved anticlockwise along with the transmit plate 12, by the fact that the back release lever 11 is so biased by the spring 16 as to maintain the projections 15 and 17 in abutment with each other. In this way, the back release lever 11 is forwardly inclined at substantially the same angle as the seat back arm 22 and thus kept from projecting out of the back base of the seat back B, as shown in FIG. 7.

Figure 8:
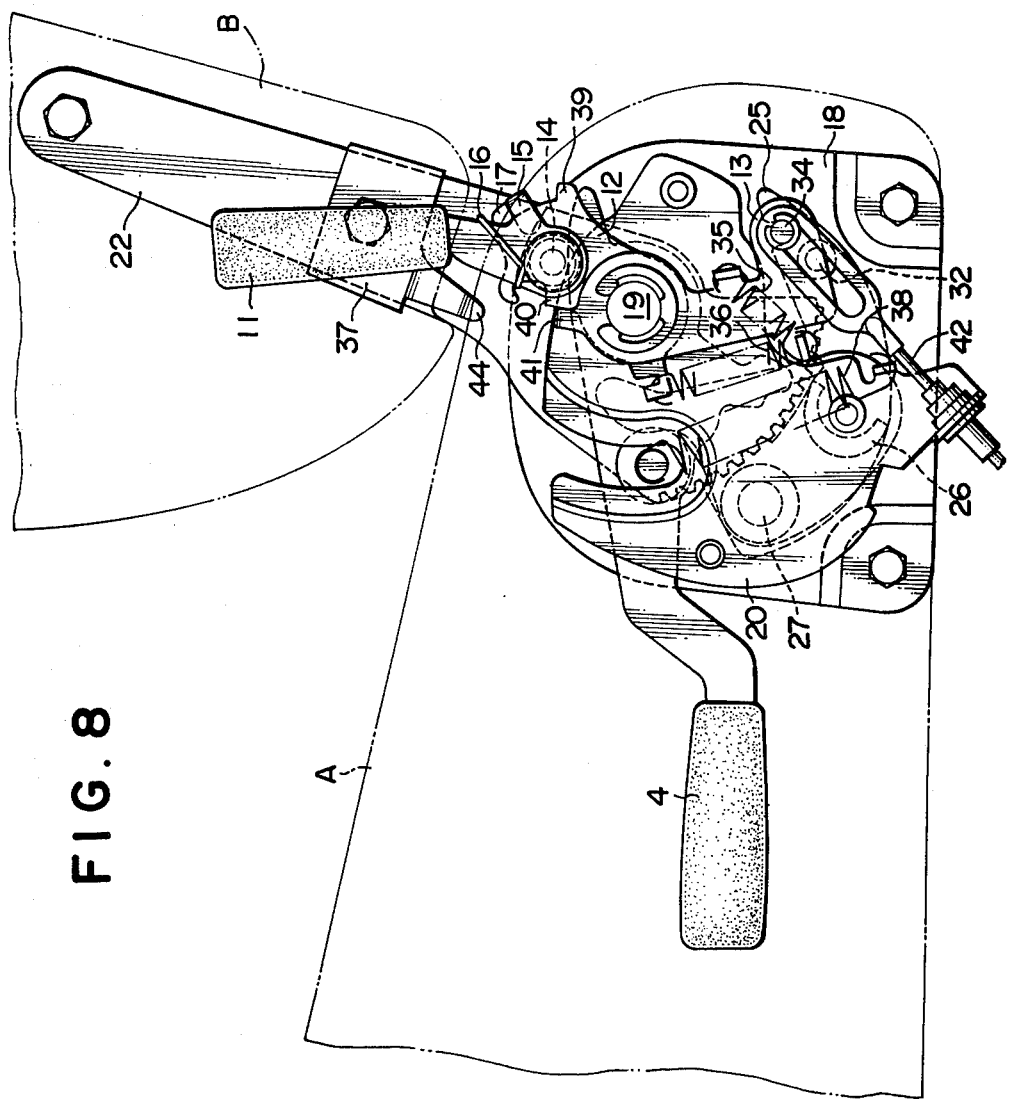
FIG. 8 is a side view illustrating the seat assembly when the seat is set to assume its normal seating position.

When the seat back B is to be returned from the walk-in position to the normal seating position, the reclining lever 4 is turned clockwise as viewed in FIG. 5 so that the lower tooth support member 24 and lower tooth 26 are pushed down by a roller 43 provided on the reclining lever 4. Consequently, the lower tooth 26 is disposed out of intermeshing relationship with the upper tooth 30. In this way, the seat back B is raised up to a desired position, and then the reclining lever 4 is released so that the lower tooth 26 is elevated to be disposed into intermeshing relationship with the upper tooth 30; thus, the seat back is fixed at the aforementioned desired position. At this point, the walk-in lever pin 34 of the walk-in lever 13, which has been elevated and disposed in engagement with the rear portion 30b of the upper tooth 30 of the seat back arm 22, is now disposed out of engagement with the rear portion 30b and pulled by the spring 35 to be turned clockwise as viewed in FIG. 5. Then, the walk-in lever 34 is brought into engagement with recessed portion 33 of the stopper lever 25 and thus stopped from the turning movement. The aforementioned turning movement of the walk-in lever 13 causes the transmit plate 12 to be pressed against projection 41 of the walk-in lever 13; thus, the transmit plate 12 is made to follow the turning movement of the walk-in lever 13 so as to be turned clockwise as viewed in FIG. 5. The back release lever 11, which is so biased by the spring 16 as to maintain the abutment between the projections 15 and 17, is turned clockwise along with the transmit plate 12. As a result, the back release lever 11 is forwardly inclined through substantially the same angle as the seat back arm 22 inclined to the normal seating position, as shown in FIG. 8, and thus, it is set to be in such a state that it is not projected out of the front or rear face of the seat back B.

Figure 9:
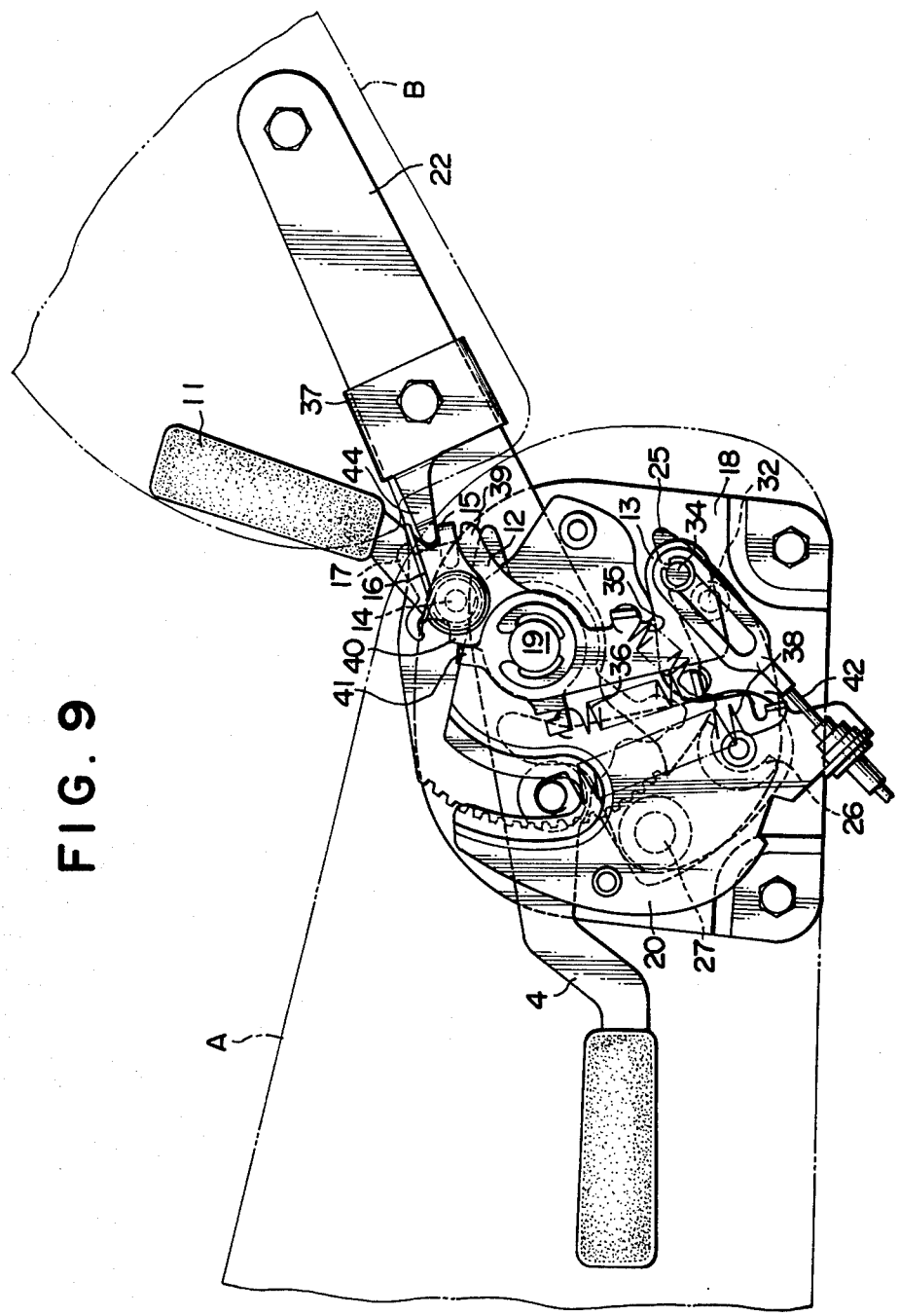
FIG. 9 is a side view illustrating the seat assembly when the seat is set to assume its full reclining position.

Finally, when the seat back B at the normal seating position is to be moved to its full reclining position, the back release lever 11 or reclining lever 4 is turned clockwise as viewed in FIG. 5 so that the lower tooth 26 is actuated, in a manner similar to that for the aforementioned normal seating position setting operation, to be disposed out of intermeshing relationship with the upper tooth 30. Thus, the seat back B can be turned to the full reclining position, and by releasing the lever 11 or 4, the seat back B is locked at the full reclining position. In this case, the walk-in lever 13 and transmit plate 12 are also actuated in a manner similar to that for the above-mentioned normal seating position setting operation, and the engagement projection 15 of the back release lever 11 is depressed against the biasing force of the spring 16 by the projection 44 provided on the depressing plate 37 of the seat back arm 22. In this way, the back release lever 11 is backwardly inclined through substantially the same angle as that of the seat back arm 22 which is also backwardly inclined to the full reclining position as shown in FIG. 9. Thus, the back release lever 11 is prevented from projecting out of the front face of the seat back B.

While the present invention has been illustrated and described with respect to a specific embodiment thereof, it is to be understood that the present invention is by no means limited thereto but covers all changes and modifications which will become possible within the scope of the appended claims.

What is claimed is:

1. An automotive seat assembly, comprising:
   a seat cushion;
   a reclinable seat back supported by said seat cushion, said seat back being mounted for movement between forwardly and rearwardly inclined positions, said seat cushion being associated with means for performing walk-in motion permitting said seat cushion to be moved forward when said seat back is forwardly inclined; and
   an operating lever device provided with means for preventing any part of said operating lever device from projecting out of the back or front face of said seat back when said seat back is forwardly or backwardly inclined, said means comprising:
   a walk-in lever normally maintained at a predetermined position and connected such that, only when a seat back arm secured to said seat back is forwardly inclined, said walk-in lever is turned about a shaft on which said seat back arm is rotatably mounted;
   a transmit plate mounted to be rotatable about said shaft and normally biased to be pressed against a projection provided on said walk-in lever;
   a back release lever mounted to be rotatable about a pin provided on said transmit plate and normally biased to be pressed against a stopper portion of said transmit plate, said back release lever being arranged to depress an operating plate associated with means for reclining said seat back, thereby permitting said seat back to be turned; and
   a depressing plate secured to said seat back arm and connected such that, only when the seat back arm is backwardly inclined, the depressing plate causes the back release lever to be turned backwardly, whereby said back release lever is prevented from projecting out of the back or front face of said seat back when said seat back is forwardly or backwardly inclined.

* * * * *